United States Patent
Whelan et al.

(10) Patent No.: US 11,242,153 B2
(45) Date of Patent: Feb. 8, 2022

(54) VARIABLE THRUST CATAPULT

(71) Applicant: GOODRICH CORPORATION, Charlotte, NC (US)

(72) Inventors: Patrick Whelan, Vacaville, CA (US); Matthew D. Salois, Vacaville, CA (US); Jeff Benjamin, Colorado Springs, CO (US); Kevin J Mueller, Dixon, CA (US)

(73) Assignee: Goodrich Corporation, Charlotte, NC (US)

( * ) Notice: Subject to any disclaimer, the term of this patent is extended or adjusted under 35 U.S.C. 154(b) by 288 days.

(21) Appl. No.: 16/667,772

(22) Filed: Oct. 29, 2019

(65) Prior Publication Data
US 2021/0122480 A1    Apr. 29, 2021

(51) Int. Cl.
| B64D 25/10 | (2006.01) |
| B64D 33/04 | (2006.01) |
| B64D 41/00 | (2006.01) |

(52) U.S. Cl.
CPC .............. B64D 25/10 (2013.01); B64D 33/04 (2013.01); B64D 41/00 (2013.01)

(58) Field of Classification Search
CPC .......... B64D 25/10; B64D 25/08; B64C 1/32; B64C 1/1476
See application file for complete search history.

(56) References Cited

U.S. PATENT DOCUMENTS

| 2,937,830 | A | | 5/1960 | Fulton | |
| 3,027,125 | A | * | 3/1962 | Fulton | B64D 25/10 244/122 AD |
| 3,055,619 | A | * | 9/1962 | Macdonald, Jr. | B64D 25/10 244/122 AB |
| 3,173,333 | A | * | 3/1965 | Martin | B64D 25/10 89/1.14 |
| 3,525,490 | A | * | 8/1970 | Duncan | A47B 96/20 244/122 R |
| 3,542,319 | A | | 11/1970 | Duncan et al. | |
| 4,399,968 | A | * | 8/1983 | Stock | B64D 7/08 244/137.4 |
| 4,673,147 | A | * | 6/1987 | Solomonides | B64D 25/10 244/122 A |
| 4,706,909 | A | * | 11/1987 | Cuevas | B64D 25/10 244/122 AC |
| 4,749,154 | A | | 6/1988 | Herndon et al. | |
| 4,765,565 | A | | 8/1988 | Buchele-Buecher et al. | |
| 5,056,739 | A | | 10/1991 | LeVay | |
| 8,528,316 | B2 | | 9/2013 | Baker et al. | |
| 2021/0222650 | A1 | * | 7/2021 | Benjamin | B64D 25/10 |

* cited by examiner

*Primary Examiner* — Brian M O'Hara
(74) *Attorney, Agent, or Firm* — Snell & Wilmer L.L.P.

(57) ABSTRACT

A rocket catapult assembly for an ejection seat may comprise a motor assembly including a proximal end and a distal end, an outlet tube coupled to the distal end, and a valve coupled to the outlet tube. The valve may be configured to vary an operating pressure based on an occupant's weight. The valve may be in a closed configuration, on open configuration, or a partially open configuration during ejection of the ejection seat.

20 Claims, 11 Drawing Sheets

VARIABLE THRUST CATAPULT

FIELD

The present disclosure relates to escape systems, and more specifically, to variable thrust catapults for multi weight occupants.

BACKGROUND

Ejection systems are designed to expel pilots from an aircraft cockpit. Ejection seats in high performance aircraft benefit from safely removing the pilot or other occupant from the disabled aircraft across a wide variety of aircraft speed regimes, altitudes and aircraft attitudes. Occupants of aircrafts may be various weights ranging from a relatively light weight individual to a relatively heavy individual, which may prevent a single amount of force of thrust to propel an occupant out of an aircraft from being desirable.

SUMMARY

A rocket catapult assembly for use in an ejection seat system of an aircraft is disclosed herein. The rocket catapult assembly may comprise: a motor assembly comprising a motor outer tube and a mortar inner casing extending from a proximal end and a distal end, the mortar inner casing defining a chamber; an outlet tube coupled to the distal end, the outlet tube in fluid communication with the chamber; and a valve coupled to the outlet tube, the valve configured to vary an operating pressure of a pressurized fluid during operation of the rocket catapult assembly.

In various embodiments, the valve comprises a solenoid valve. The solenoid valve may be in communication with a controller. The solenoid valve may be configured to be in a closed position in response to a command by the controller when a load of a load cell exceeds a threshold load. The valve may comprise a modulated bleed valve. The modulated bleed valve may be in communication with a controller. The modulated bleed valve may be configured to vary between an open configuration and a closed configuration to maintain a desired pressure in response to a command by the controller of the desired pressure based on a measured load of a load cell. The valve may comprise a relief valve. The relief valve may be configured to at least partially open in response to a pressure in the outlet tube exceeding a pressure threshold.

An aircraft ejection system is disclosed herein. The aircraft ejection system may comprise: an ejection seat, comprising: a seat pan; a seat back coupled to the seat pan; and a rocket catapult assembly coupled to the seat back, the rocket catapult assembly comprising: a motor assembly comprising a motor outer tube and a mortar inner casing extending from a proximal end and a distal end, the mortar inner casing defining a chamber; an outlet tube coupled to the distal end, the outlet tube in fluid communication with the chamber; and a valve coupled to the outlet tube, the valve configured to vary an operating pressure of a pressurized fluid during operation of the rocket catapult assembly.

In various embodiments, the aircraft ejection system may further comprise a display switch, wherein the display switch is configured to create an electrical connection and open the valve from a closed configuration to an open configuration, and wherein the valve is a solenoid valve. The aircraft ejection system may further comprise a display switch, wherein the display switch is configured to create an electrical connection and close the valve from a closed configuration to an open configuration, and wherein the valve is a solenoid valve. The aircraft ejection system may further comprise a load cell coupled to the seat pan. The aircraft ejection system may further comprise a controller in electrical communication with the load cell and the valve. The valve may be a solenoid valve. The solenoid valve may be configured to be in a closed position in response to a command by the controller when a load of the load cell exceeds a threshold load. The valve may be a modulated bleed valve. The modulated bleed valve may be in communication with the controller. The modulated bleed valve may be configured to vary between an open configuration and a closed configuration to maintain a desired pressure in response to a command by the controller of the desired pressure based on a measured load of the load cell. The valve may be a relief valve. The relief valve may be configured to at least partially open in response to a pressure in the outlet tube exceeding a pressure threshold.

A method of controlling an operating pressure of a rocket catapult assembly for an ejection seat of an aircraft is disclosed herein. The method may comprise: compressing a load cell disposed in a seat pan of the ejection seat; and opening or closing a valve in response to compressing the load cell, wherein the valve is coupled to, and in fluid communication with, an outlet tube, the outlet tube coupled to a distal end of a motor assembly of the rocket catapult assembly.

In various embodiments, the valve is a solenoid valve. The opening or closing the solenoid valve may further comprise opening the solenoid valve when a load measured by the load cell exceeds a load threshold. The valve may be a solenoid valve. Prior to opening or closing the solenoid valve, the method may further comprise completing an electrical connection in response to compressing the load cell. The valve may be a modulated bleed valve.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
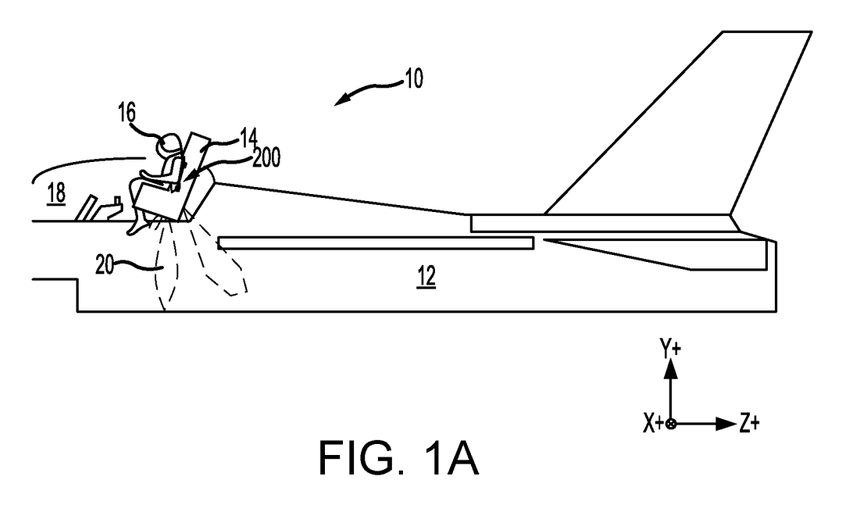
FIG. 1A illustrates an aircraft ejection system, in accordance with various embodiments.

With reference to FIG. 1A, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20. In accordance with various embodiments, ejection seat 14 includes rocket catapult assembly 200. Rocket catapult assembly 200 may comprise an element of propulsion system 20 and be configured to extract the ejection seat 14 from cockpit 18.

Figure 1B:
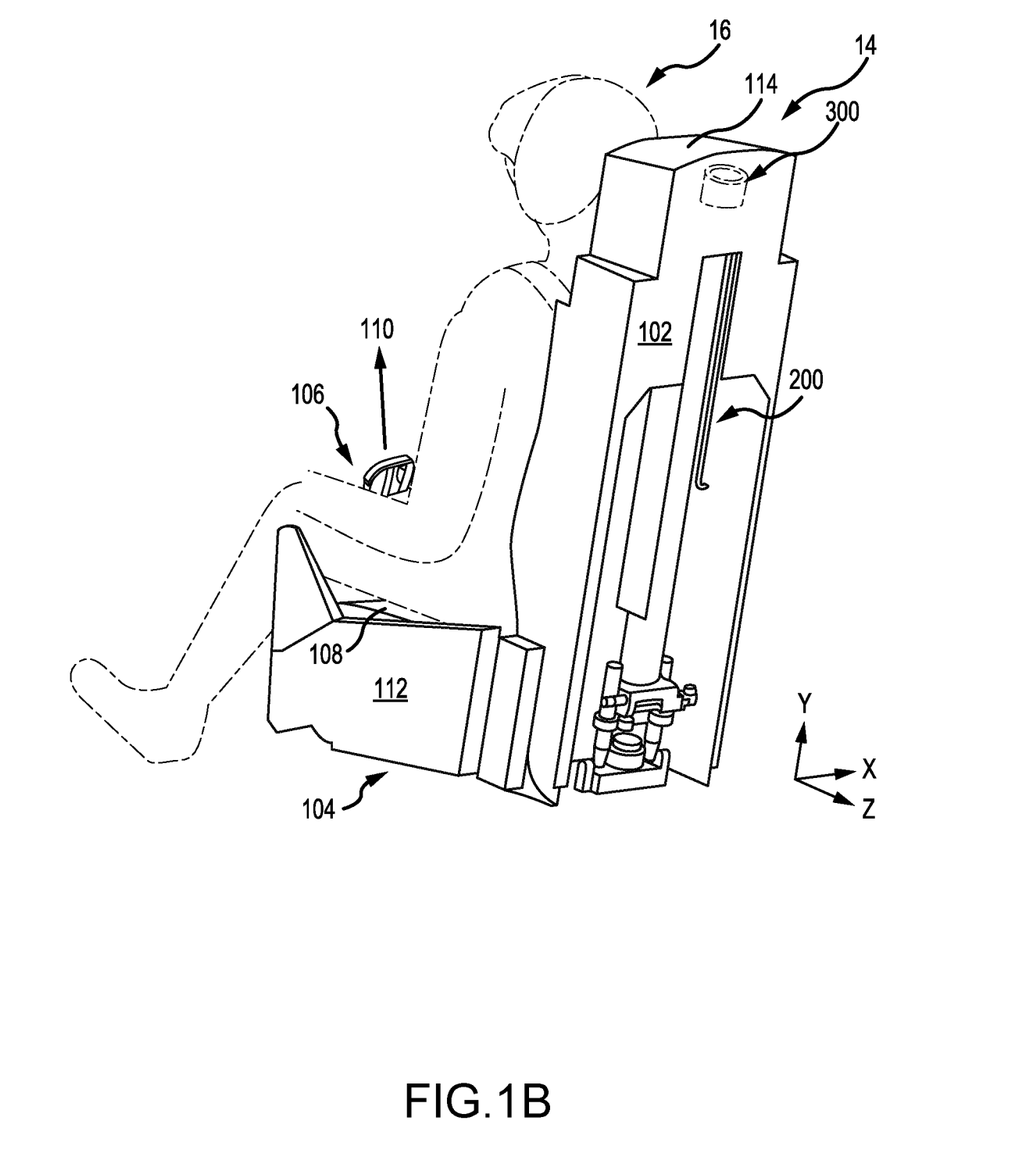
FIG. 1B illustrates an ejection seat having a catapult system in an inactive state, in accordance with various embodiments.

With additional reference to FIG. 1B, ejection seat 14 is illustrated with rocket catapult assembly 200 in an inactive state, in accordance with various embodiments. Ejection seat 14 includes a seat back 102 and a seat pan 104. The rocket catapult assembly 200 is coupled to seat back 102. In various embodiments, an ejection handle 106 may be located proximate a front 108 of seat pan 104. Front 108 of seat pan 104 is generally opposite, or distal, seat back 102. While FIG. 1B shows ejection handle 106 located at front 108 of seat pan 104, it is further contemplated and understood that ejection handle 106 may be located anywhere that is accessible to an occupant of ejection seat 14. For example, ejection handle 106 may be located on a side 112 of seat pan 104 or a headrest 114 of seat back 102.

Figure 2:
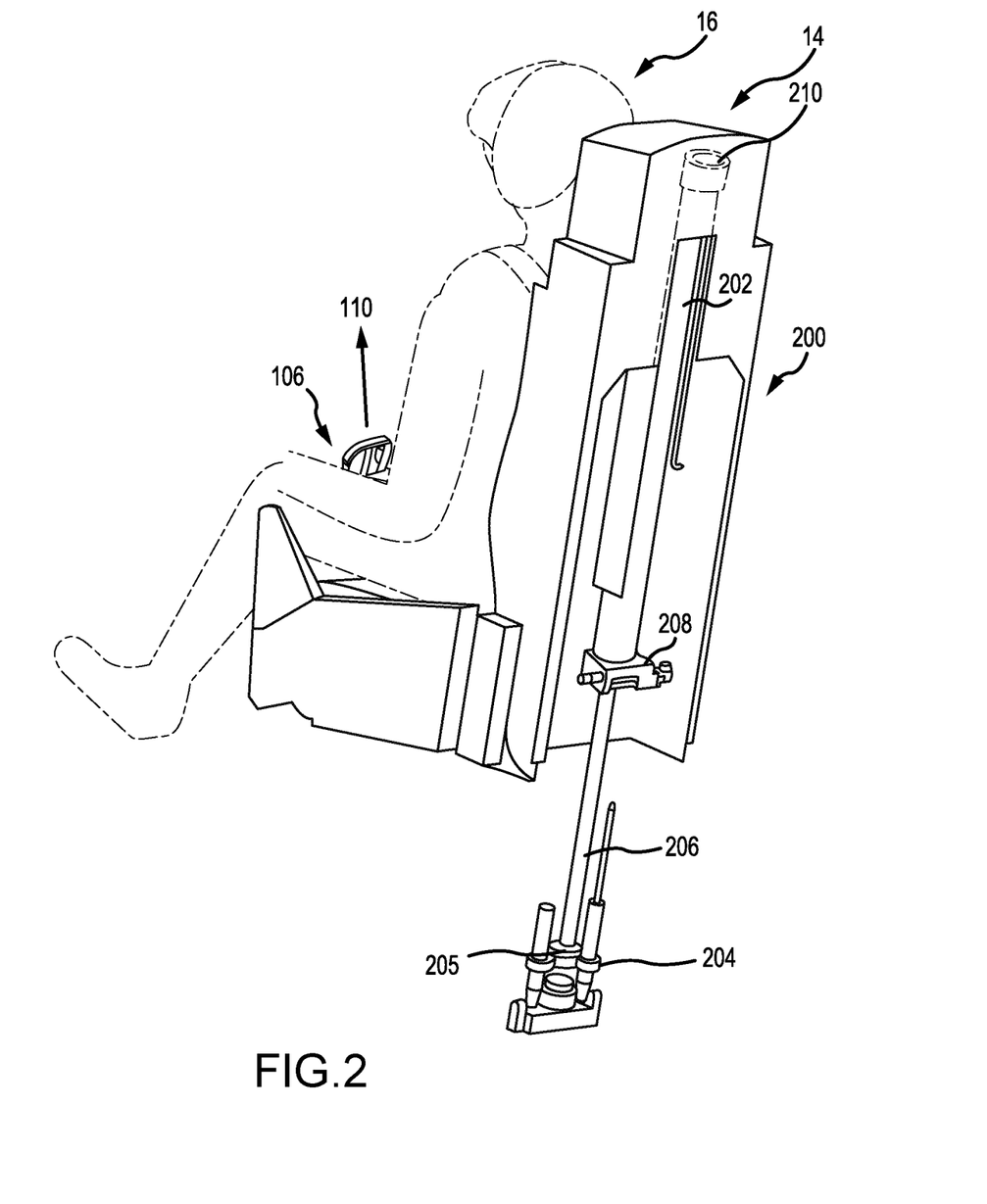
FIG. 2 illustrates an ejection seat having a catapult system in an active state, in accordance with various embodiments.

With additional reference to FIG. 2, ejection seat 14 is illustrated with rocket catapult assembly 200 in an active state, in accordance with various embodiments. Ejection handle 106 may be configured to initiate an ejection sequence upon actuation. For example, occupant 16 pulling ejection handle 106 in the direction of arrow 110 may activate the rocket catapult assembly 200. Rocket catapult assembly 200 may comprise a motor assembly 202, a breach 204, a catapult cartridge unit 205, a nozzle assembly 208, and a motor cap assembly 210. In response to activation, the catapult cartridge unit 205 may ignite and tend to produce relatively hot, high pressure, gas. Breach 204 may be coupled to the aircraft 12 and comprise a mortar tube 206 disposed within the motor assembly 202. In various embodiments, motor cap assembly 210 may direct a first portion of gas to the breach 204 tending thereby to drive the mortar tube 206 outward of the motor assembly 202 and cause ejection seat 14 to be expelled from cockpit 18. In various embodiments, mortar tube 206 may separate from the motor assembly 202 in response to ejection seat 14 departing from the cockpit 18. In various embodiments, the breach 204 may include an integral gas generator which, in response to activation, may drive the mortar tube 206 outward of the motor assembly 202 and cause ejection seat 14 to be expelled from cockpit 18. In various embodiments, the motor assembly 202 may be ignited in response to mortar tube 206 exiting the motor assembly 202.

Figure 3:
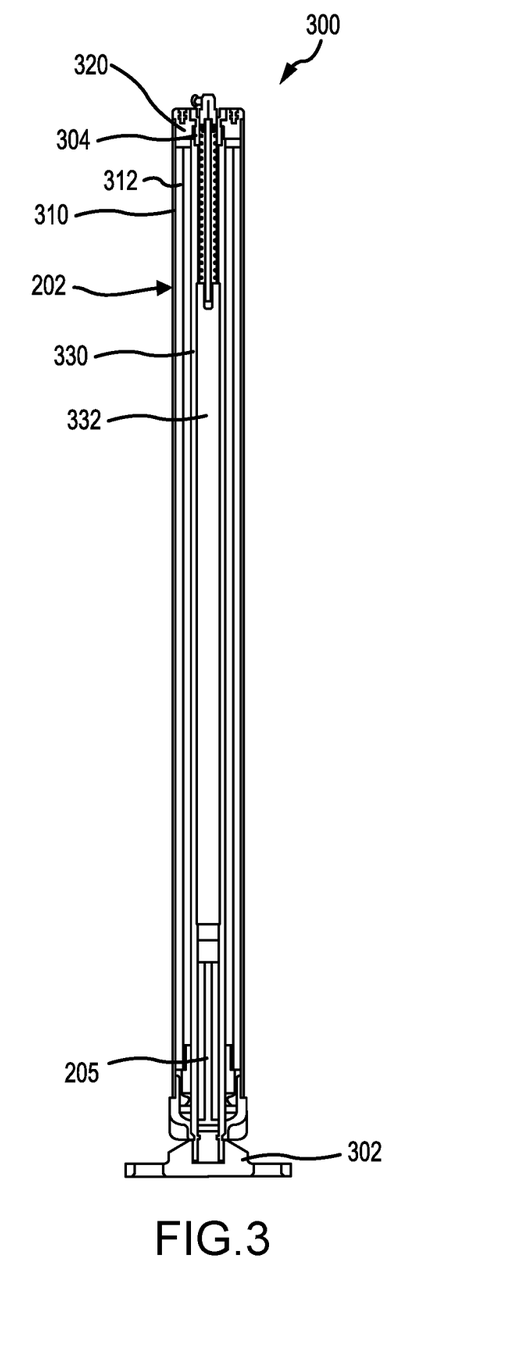
FIG. 3 illustrates a cross-sectional portion of a rocket catapult assembly, in accordance with various embodiments.

Referring now to FIG. 3, a cross-section of a portion of a rocket catapult assembly 300 in an inactive state, in accordance with various embodiments, is illustrated. The rocket catapult assembly 300 may comprise a proximal end 302 and a distal end 304 disposed opposite the proximal end 302. The proximal end 302 may be configured to be coupled to an aircraft (e.g., aircraft 12 from FIG. 1A). The distal end 304 may be configured to be coupled to an ejection seat (e.g., ejection seat 14 from FIG. 1A). The rocket catapult assembly 300 may further comprise a motor outer case 310 extending from proximal end 302 to distal end 304, a head cap 320 coupled to the motor outer case 310 at distal end 304, and a mortar inner case 330 disposed radially inward from motor outer case 310. The head cap 320 may be coupled to the motor outer case 310 by any method known in the art, such as a lock ring, or the like. In various embodiments, the mortar inner case 330 defines a chamber 332. The chamber 332 may be in fluid communication with a motor cap assembly (e.g., motor cap assembly 210 in FIG. 2).

Figure 4:
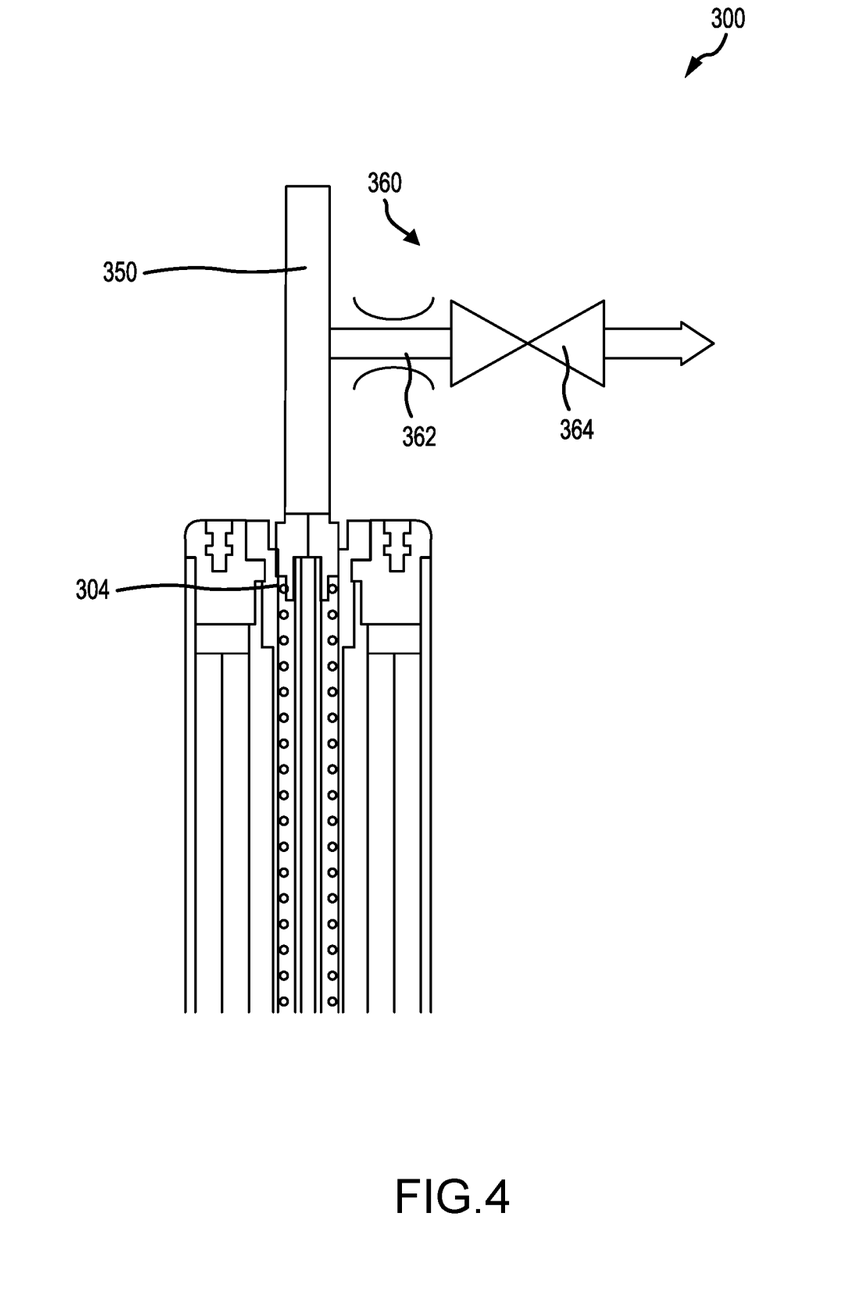
FIG. 4 illustrates a schematic of a portion of a rocket catapult assembly, in accordance with various embodiments.

Referring now to FIG. 4, a schematic view of a portion of a rocket catapult assembly 300, in accordance with various embodiments, is illustrated. In various embodiments, a rocket catapult assembly 300 may further comprise an outlet tube 350 coupled to the distal end 304 and in fluid communication with the chamber 332. The rocket catapult assembly may further comprise an auxiliary port 360 coupled to, and in fluid communication with, outlet tube 350. In various embodiments, auxiliary port 360 may comprise an orifice 362 and a valve 364. The orifice 362 may be configured to meter a flow rate to the valve 364. In various embodiments, the valve 364 may be configured to bleed a pressurized gas during operation of the rocket catapult assembly 300. In various embodiments, the valve 364 may be configured to bleed (i.e., release to ambient) a portion of the pressurized gas when an aircraft occupant is a lightweight occupant (e.g., when an aircraft occupant is below a threshold weight). In various embodiments, the valve 364 may be configured to be closed when an aircraft occupant is a heavy occupant (e.g., when an aircraft occupant is above a threshold weight). In various embodiments, the valve may be configured to operate between open and closed based on a weight of an occupant.

Figure 5:
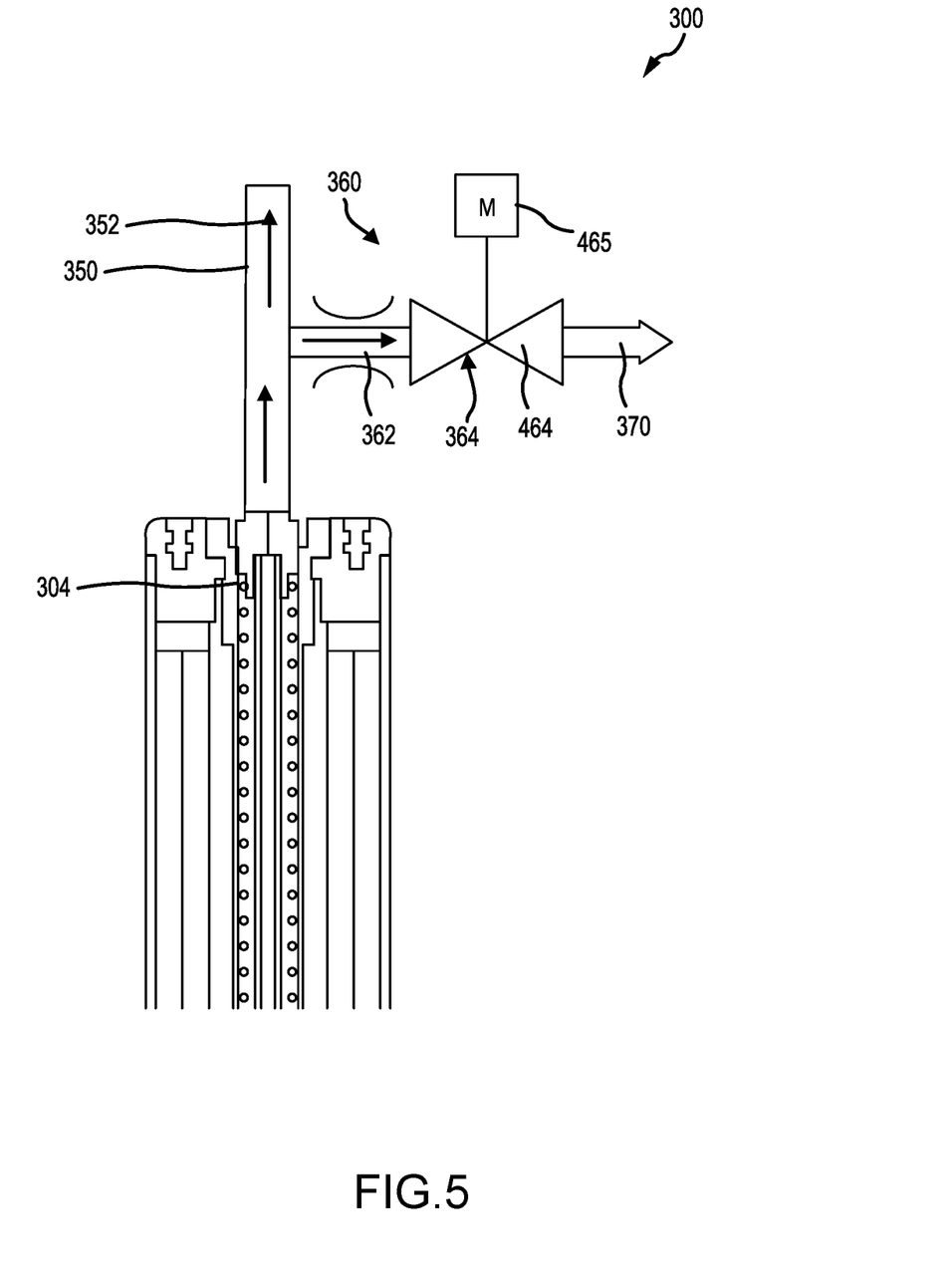
FIG. 5 illustrates a schematic of a portion of a rocket catapult assembly, in accordance with various embodiments.

Referring now to FIG. 5, a schematic view of a portion of a rocket catapult assembly 300, in accordance with various embodiments, is illustrated. In various embodiments the valve 364 may comprise a modulated bleed valve 464. In various embodiments, the modulated bleed valve 464 may comprise a valve actuator 465 configured to completely open, partially open, or completely close the modulated bleed valve 464, during ejection of an ejection seat as commanded by a controller, based on, in various embodiments, the weight of an occupant and/or a desired amount of operating pressurized gas and a desired amount of expelled gas 370. Stated another way, the modulated bleed valve 464 may assume a closed configuration, an open configuration (100% open), and/or a partially open configuration (ranging anywhere between 0% open and 100% open) as commanded by a controller. In various embodiments, the closed configuration may comprise the modulated bleed valve 464 being a minimum percent open, which may be set at any desired minimum percent open. For the sake of simplicity, in this disclosure, the minimum percent open for the closed configuration is 0% open. In various embodiments, the valve actuator 465 may cause the modulated bleed valve 464 to become more open or less open, at any time before, during ejection of an ejection seat to assume the open configuration, a partially open configuration, and/or the closed configuration.

In various embodiments, when the modulated bleed valve 464 is in an open configuration or a partially open configuration, the modulated bleed valve 464 may be configured to reroute the pressurized gas 352 in outlet tube 350 to an external part of a rocket catapult assembly 300 in the form of expelled gas 370. As such, ejection of the ejection seat may operate with a portion of the pressurized gas 352 when an occupant is below a threshold weight, resulting in a lower ejection force and/or a safer ejection for an occupant.

Figure 6:
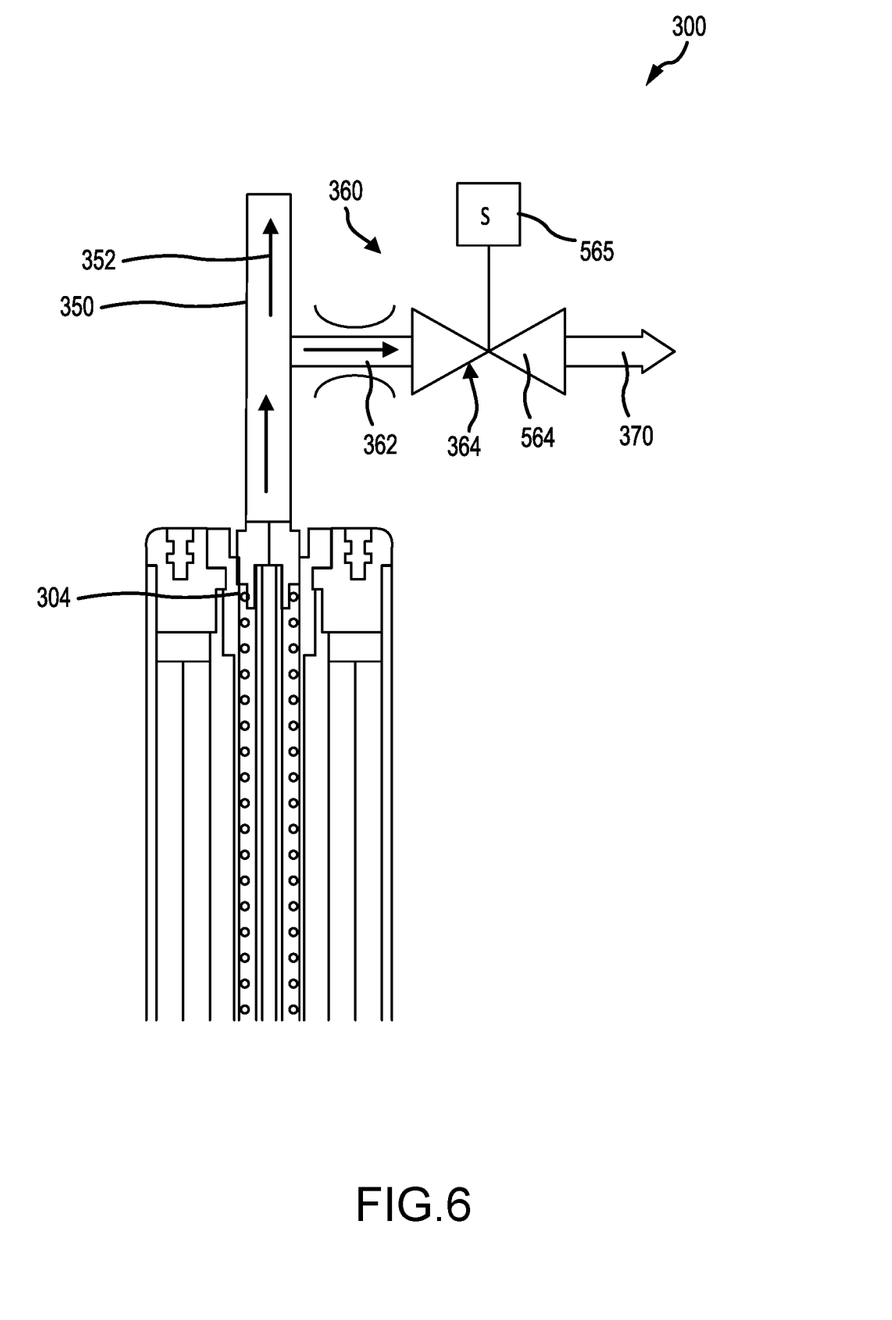
FIG. 6 illustrates a schematic of a portion of a rocket catapult assembly, in accordance with various embodiments.

Referring now to FIG. 6, a schematic view of a portion of a rocket catapult assembly 300, in accordance with various embodiments, is illustrated. In various embodiments the valve 364 may comprise a solenoid valve 564. In various embodiments, the solenoid valve 564 may comprise a valve actuator 565 configured to completely open or completely close the solenoid valve 564, during ejection of an ejection seat as commanded by a controller, based on, in various embodiments, a weight of an occupant and/or a desired amount of operating pressurized gas and a desired amount of expelled gas 370. Stated another way, the solenoid valve 564 may assume a closed configuration or an open configuration (100% open) as commanded by a controller, a switch, a load cell, or the like.

In various embodiments, when the solenoid valve 564 is in an open configuration, the solenoid valve 564 may be configured to reroute the pressurized gas 352 in outlet tube 350 to an external part of a rocket catapult assembly 300 in the form of expelled gas 370. As such, ejection of the ejection seat may operate with a portion of the pressurized gas 352 when an occupant is below a threshold weight, resulting in a lower ejection force and/or a safer ejection for an occupant.

Figure 7:
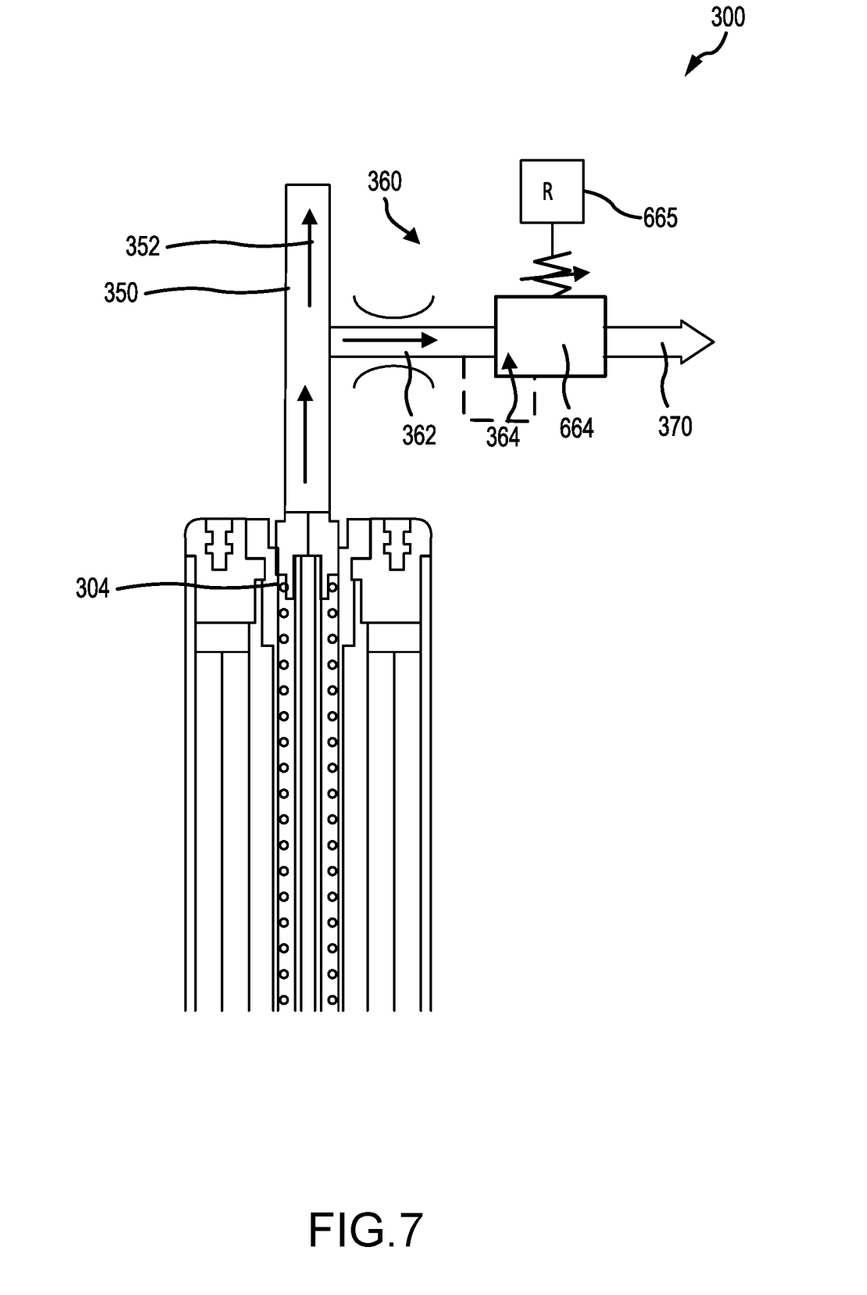
FIG. 7 illustrates a schematic of a portion of a rocket catapult assembly, in accordance with various embodiments.

Referring now to FIG. 7, a schematic view of a portion of a rocket catapult assembly 300, in accordance with various embodiments, is illustrated. In various embodiments the valve 364 may comprise a relief valve 664. In various embodiments, the relief valve 664 may comprise a valve actuator 665 configured to open, during ejection of an ejection seat, based on, in various embodiments, a pressure of the pressurized gas 352 exceeding a pressure threshold in outlet tube 350. For example, when an occupant is less than a threshold weight, outlet tube 350 may experience increased pressure, which may rise above a threshold pressure for relief valve 664 to open. As such, a portion of pressurized gas 352 may be rerouted through relief valve 664 in the form of expelled gas 370. Stated another way, the relief valve 664 may assume a closed configuration, a partially open configuration, or a partially open configuration as determined by a pressure of the pressurized gas 352 in the outlet tube 350 during ejection of an ejection seat.

In various embodiments, when the relief valve 664 is in an open configuration or a partially open configuration, the relief valve 664 may be configured to reroute the pressurized gas 352 in outlet tube 350 to an external part of a rocket catapult assembly 300 in the form of expelled gas 370. As such, ejection of the ejection seat may operate with a portion of the pressurized gas 352 when an occupant is below a threshold weight (i.e., a pressure in outlet tube 350 is above a pressure threshold), resulting in a lower ejection force and/or a safer ejection for an occupant.

Figure 8:
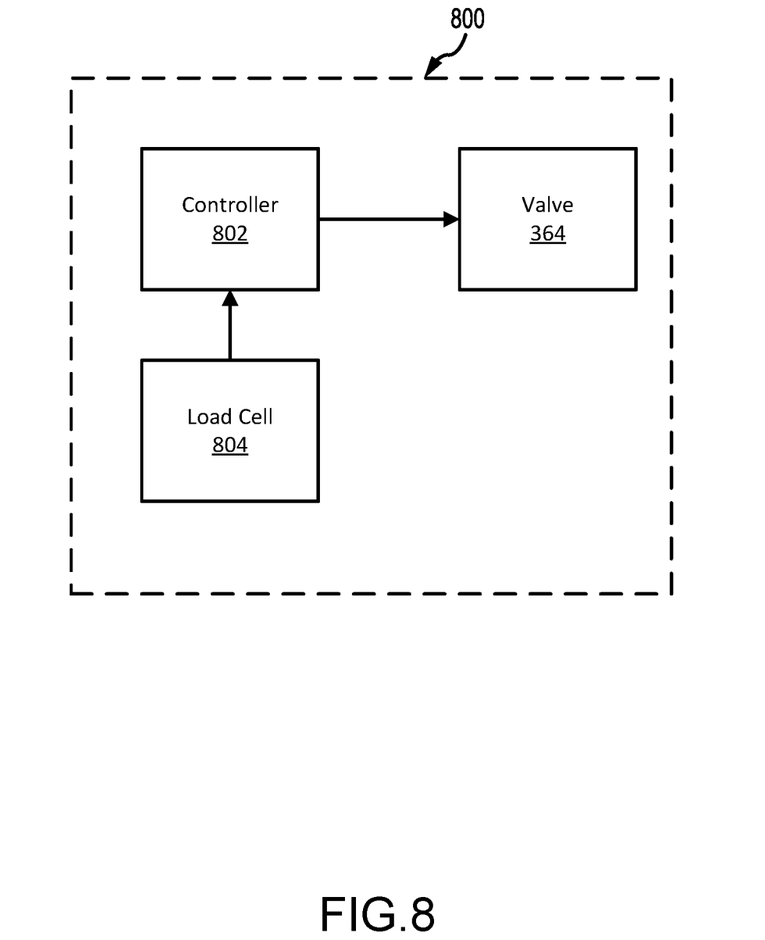
FIG. 8 illustrates a control system for a valve in a rocket catapult assembly, in accordance with various embodiments.

In various embodiments and with additional reference to FIG. 8, a schematic block diagram of a control system 800 for valve 364 is illustrated. System 800 includes a controller 802 in electronic communication with a load cell 804 and the valve 364. In various embodiments, controller 802 may be integrated into computer systems onboard aircraft 12 and/or ejection seat 14. In various embodiments, controller 802 may be configured as a central network element or hub to access various systems, engines, and components of system 800. Controller 802 may comprise a network, computer-based system, and/or software components configured to provide an access point to various systems, engines, and components of system 800. In various embodiments, controller 802 may comprise a processor. In various embodiments, controller 802 may be implemented in a single processor. In various embodiments, controller 802 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 802 may comprise a processor configured to implement various logical operations in response to execution of instructions, for example, instructions stored on a non-transitory, tangible, computer-readable medium configured to communicate with controller 802.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nutjten to fall outside the scope of patentable subject matter under 35 U.S.C. § 101.

In various embodiments, controller 802 may be in electronic communication with load cell 804. Load cell 804 may be disposed in seat pan 104. Load cell 804 may comprise any load cell known in the art, such as a compression load cell, or the like. Load cell 804 may be configured to measure a weight of an occupant 16. Load cell 804 may be configured to transmit measurements to controller 802, thereby providing the measured weight of the occupant 16 to controller 802.

In various embodiments, controller 802 may receive an ejection command from the ejection handle 106. In response to the ejection command, the controller 802 may command the rocket catapult assembly 200 to transition from the inactive state to the active state. In response, a catapult cartridge unit may ignite a cartridge and generate the high pressure gas to outlet tube 350. When valve 364 is a modulated bleed valve 464, the controller 802 may be configured to calculate an ejection pressure to maintain in outlet tube 350 based on the weight provided by load cell 804 (i.e., the modulated bleed valve may alternate between an open configuration and a closed configuration to maintain a desired pressure). When the valve 364 is a solenoid valve 564, the controller 802 may be configured to open the solenoid valve 564 when a weight of an occupant 16, as measured by load cell 804 is below a weight threshold.

In this regard and by controlling the flow of pressurized gas in the rocket catapult assembly 300 as a function of an occupant weight, an occupant 16 of an aircraft 12 may be ejected at a force based on the weight of the occupant 16, as opposed to a maximum weight of an occupant.

Figure 9:
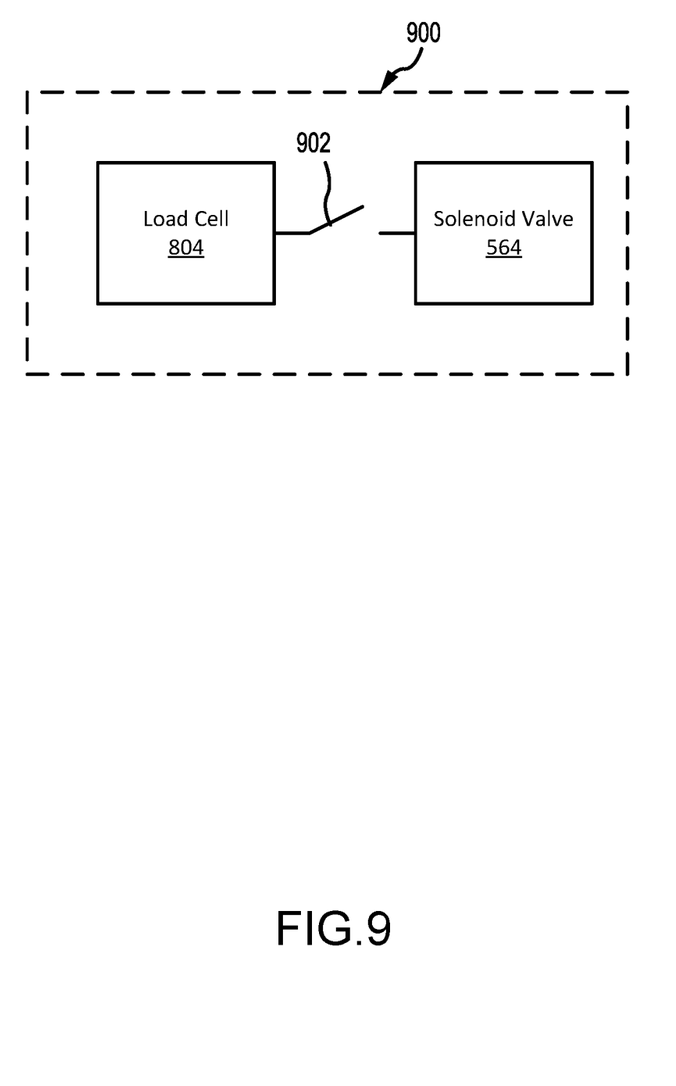
FIG. 9 illustrates a control system for a valve in a rocket catapult assembly, in accordance with various embodiments.

With reference now to FIG. 9, a schematic block diagram of a control system 900 for solenoid valve 564 is illustrated. In various embodiments, control system 900 comprises a solenoid valve 564 and a load cell 804. The load cell 804 may be electrically coupled to the solenoid valve by an electrical switch 902. In various embodiments, the electrical switch 902 may be configured to open solenoid valve 564 from a closed configuration to an open configuration when load cell 804 experiences a weight below a threshold weight (i.e., the occupant's weight completes the circuit and opens solenoid valve 564 when the occupant 16 is below a threshold weight). In various embodiments, the electrical switch 902 may be configured to close solenoid valve 564 from an open configuration to a closed configuration when a load cell 804 experiences a weight above a threshold weight (i.e., the occupant's weight completes the circuit and closes solenoid valve 564 when the occupant 16 is above a threshold weight).

Figure 10:
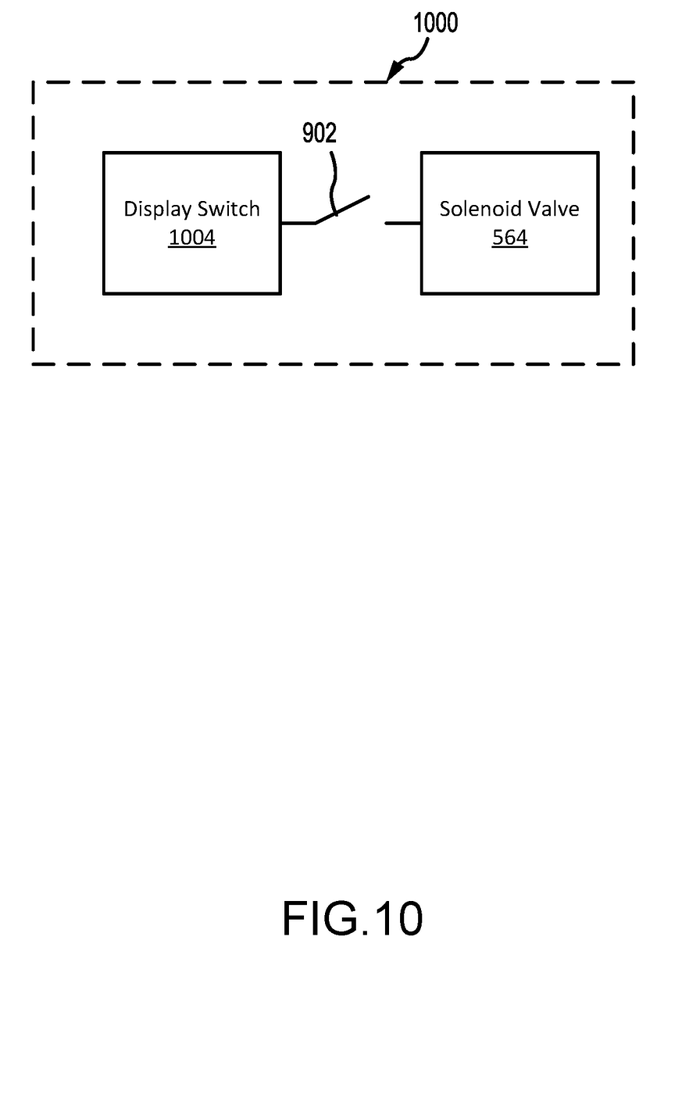
FIG. 10 illustrates a control system for a valve in a rocket catapult assembly, in accordance with various embodiments.

With reference now to FIG. 10, a schematic block diagram tube of a control system 900 for solenoid valve 564 is illustrated. In various embodiments, control system 1000 comprises a solenoid valve 564 and a display switch 1004. The display switch 1004 may be disposed in a cockpit of aircraft 12 and electrically coupled to the solenoid valve by an electrical switch 902. In various embodiments, the electrical switch 902 may be configured to open solenoid valve 564 from a closed configuration to an open configuration when display switch 1004 is manually turned on (i.e., the occupant 16 manually turns display switch "ON" when occupant's weight is below a threshold weight, which completes the circuit and opens solenoid valve 564). In various embodiments, the electrical switch 902 may be configured to close solenoid valve 564 from an open configuration to a closed configuration when display switch 1004 is manually turned "ON" (i.e., the occupant 16 manually turns display switch "ON" when occupant's weight is above a threshold weight. which completes the circuit and closes solenoid valve 564).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A rocket catapult assembly for use in an ejection seat system of an aircraft, comprising:
   a motor assembly comprising a motor outer tube and a mortar inner casing extending from a proximal end and a distal end, the mortar inner casing defining a chamber;
   an outlet tube coupled to the distal end, the outlet tube in fluid communication with the chamber; and a valve coupled to the outlet tube, the valve configured to vary an operating pressure of a pressurized fluid during operation of the rocket catapult assembly;

wherein the proximal end of the rocket catapult assembly is configured to be coupled to the aircraft.

2. The rocket catapult assembly of claim 1, wherein the valve comprises a solenoid valve.

3. The rocket catapult assembly of claim 2, wherein the solenoid valve is in communication with a controller, wherein the solenoid valve is configured to be in a closed position in response to a command by the controller when a load of a load cell exceeds a threshold load.

4. The rocket catapult assembly of claim 1, wherein the valve comprises a modulated bleed valve.

5. The rocket catapult assembly of claim 4, wherein the modulated bleed valve is in communication with a controller, wherein the modulated bleed valve is configured to vary between an open configuration and a closed configuration to maintain a desired pressure in response to a command by the controller of the desired pressure based on a measured load of a load cell.

6. The rocket catapult assembly of claim 1, wherein the valve comprises a relief valve.

7. The rocket catapult assembly of claim 6, wherein the relief valve is configured to at least partially open in response to a pressure in the outlet tube exceeding a pressure threshold.

8. An aircraft ejection system comprising:
an ejection seat, comprising:
a seat pan;
a seat back coupled to the seat pan; and
a rocket catapult assembly coupled to the seat back, the rocket catapult assembly comprising:
a motor assembly comprising a motor outer tube and a mortar inner casing extending from a proximal end and a distal end, the mortar inner casing defining a chamber;
an outlet tube coupled to the distal end, the outlet tube in fluid communication with the chamber; and
a valve coupled to the outlet tube, the valve configured to vary an operating pressure of a pressurized fluid during operation of the rocket catapult assembly;
wherein the proximal end of the rocket catapult assembly is configured to be coupled to an aircraft.

9. The aircraft ejection system of claim 8, further comprising a display switch, wherein the display switch is configured to create an electrical connection and open the valve from a closed configuration to an open configuration, and wherein the valve is a solenoid valve.

10. The aircraft ejection system of claim 8, further comprising a display switch, wherein the display switch is configured to create an electrical connection and close the valve from a closed configuration to an open configuration, and wherein the valve is a solenoid valve.

11. The aircraft ejection system of claim 8, further comprising a load cell coupled to the seat pan.

12. The aircraft ejection system of claim 11, further comprising a controller in electrical communication with the load cell and the valve.

13. The aircraft ejection system of claim 12, wherein the valve is a solenoid valve, and wherein the solenoid valve is configured to be in a closed position in response to a command by the controller when a load of the load cell exceeds a threshold load.

14. The aircraft ejection system of claim 12, wherein the valve is a modulated bleed valve, and wherein the modulated bleed valve is in communication with the controller, wherein the modulated bleed valve is configured to vary between an open configuration and a closed configuration to maintain a desired pressure in response to a command by the controller of the desired pressure based on a measured load of the load cell.

15. The aircraft ejection system of claim 8, wherein the valve is a relief valve.

16. The aircraft ejection system of claim 15, wherein the relief valve is configured to at least partially open in response to a pressure in the outlet tube exceeding a pressure threshold.

17. A method of controlling an operating pressure of a rocket catapult assembly for an ejection seat of an aircraft, the method comprising:
compressing a load cell disposed in a seat pan of the ejection seat; and
opening or closing a valve in response to compressing the load cell, wherein the valve is coupled to, and in fluid communication with, an outlet tube, the outlet tube coupled to a distal end of a motor assembly of the rocket catapult assembly;
wherein a proximal end of the rocket catapult assembly is configured to be coupled to the aircraft.

18. The method of claim 17, wherein the valve is a solenoid valve, and wherein the step of opening or closing the solenoid valve further comprises opening the solenoid valve when a load measured by the load cell exceeds a load threshold.

19. The method of claim 17, wherein the valve is a solenoid valve, and wherein prior to the step of opening or closing the solenoid valve, the method further comprises completing an electrical connection in response to compressing the load cell.

20. The method of claim 17, wherein the valve is a modulated bleed valve.

* * * * *